(12) United States Patent
Sato et al.

(10) Patent No.: US 6,480,777 B1
(45) Date of Patent: Nov. 12, 2002

(54) HYDRAULIC PRESSURE CONTROL DEVICE FOR AUTOMATIC TRANSMISSION

(75) Inventors: Katsutoshi Sato, Toyoake (JP); Yasuo Shirai, Chiryu (JP); Akira Aikawa, Aichi-ken (JP); Hiroaki Kato, Kuwana (JP); Atsumi Ohara, Ibaraki (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/058,030

(22) Filed: Jan. 29, 2002

(30) Foreign Application Priority Data

Jan. 29, 2001 (JP) .......................................... 2001-019827

(51) Int. Cl.[7] .............................................. B60K 41/08
(52) U.S. Cl. ......................................... 701/60; 701/61
(58) Field of Search .............................. 701/60, 61, 55, 701/51; 192/3.51; 477/155, 154, 158, 162, 147, 43, 44, 148, 149, 156

(56) References Cited

U.S. PATENT DOCUMENTS

| | | | | |
|---|---|---|---|---|
| 5,195,035 A | * | 3/1993 | Asahara et al. ............... | 701/60 |
| 5,846,370 A | * | 12/1998 | Kozaki ......................... | 701/60 |
| 5,865,707 A | * | 2/1999 | Shimacla et al. ............. | 701/60 |
| 6,094,613 A | * | 7/2000 | Ochi et al. .................... | 701/60 |
| 6,128,565 A | * | 10/2000 | Tsutsui et al. ................ | 701/61 |

FOREIGN PATENT DOCUMENTS

| | | | | |
|---|---|---|---|---|
| JP | 401279159 | * | 11/1989 | ................... 701/60 |
| JP | 10-153257 A | | 6/1998 | |

* cited by examiner

*Primary Examiner*—Richard M. Camby
(74) *Attorney, Agent, or Firm*—Burns, Doane, Swecker & Mathis, LLP

(57) ABSTRACT

A hydraulic pressure control device for an automatic transmission is adapted to smoothly change the slip amount of the automatic transmission when a clutch to clutch shift control is performed. The hydraulic pressure control device uses a reference model showing a behavior with an output corresponding to a predetermined slip amount which smoothly varies over time with respect to a target slip amount which varies in a stepped manner. The hydraulic pressure is applied to a release side frictional engagement element using a controller $C_{EMM}(s)$ which shows a behavior such that the controller $C_{EMM}(s)$ and a controlled object $P(s)$ are collaborated to correspond to the reference model. The controller $C_{EMM}(s)$ and the controlled object $P(s)$ have the hydraulic pressure applied to the release side frictional engagement element of the automatic transmission as an input and the slip amount of the automatic transmission as an output.

15 Claims, 10 Drawing Sheets

M(s): Reference Model $P(s)$: Controlled Object
$C_{EMM}(s)$: Controller Obtained by Complete Model Matching Method S: Differential Operator
P(s): Controlled Object
$C_{EMM}(s)$: Controller Obtained by Complete Model Matching Method
M(s): Reference Model
T: Error Feedback Gain

HYDRAULIC PRESSURE CONTROL DEVICE FOR AUTOMATIC TRANSMISSION

This application is based on and claims priority under 35 U.S.C. §119 with respect to Japanese Application 2001-019827 filed on Jan. 29, 2001, the entire content of which is incorporated herein by reference.

FIELD OF THE INVENTION

This invention generally relates to an automatic transmission. More particularly, the present invention pertains to a hydraulic pressure control device for an automatic transmission for automatically changing a shift by controlling a plurality of frictional engagement elements to appropriately control hydraulic pressure for performing the engagement and the release of the frictional engagement elements.

BACKGROUND OF THE INVENTION

The reduction of the transmitting torque by a release side frictional engagement element in accordance with the increase of the transmitting torque of an engagement side frictional engagement element is required in a shift change. A one-way clutch is a mechanism adapted for reducing the transmitting torque by the release side frictional engagement element. Recently, the one-way clutch has been replaced by a clutch to clutch shift control for achieving the function of the one-way clutch by the hydraulic pressure control to the frictional engagement element.

In the clutch to clutch shift control, when the hydraulic pressure control is not performed appropriately, the output torque of the automatic transmission is suddenly changed and brings about a deterioration of the shift change feeling. For example, when the reduction of the transmitting torque of the release side frictional engagement element is delayed relative to the increase of the transmitting torque of the engagement side frictional engagement element, the output torque is suddenly reduced because of the generation of a so-called inter-locking conditioning condition. On the other hand, when the reduction of the transmitting torque of the release side frictional element relative to the increase of the transmitting torque of the engagement side frictional engagement element occurs too early, the turbine speed is increased (i.e., the turbine rotational number is suddenly increased), thus suddenly reducing the output torque.

Japanese Patent Laid-Open Publication No. Hei 10-153257 discloses a hydraulic pressure control device for an automatic transmission which is adapted to address the difficulties mentioned above. According to this known device, a slip of the release side frictional engagement element is generated by reducing the hydraulic pressure relative to the release side frictional engagement element so that the speed ratio (i.e., the turbine speed/output shaft rotation speed) is within a predetermined range. Simultaneously, the hydraulic pressure relative to the engagement side frictional engagement element is gradually increased. Thus, the speed ratio is sensitively varied in accordance with the engagement force of the engagement side frictional engagement elements, the completion time of preparation for connection (i.e., the time when the sudden increase of the turbine rotational number can be prevented) can be detected based on the speed ratio, and the hydraulic pressure relative to the release side frictional engagement element is suddenly reduced after the detection of the completion time of the preparation for connection.

Generally, the turbine speed becomes unstable when slip is generated and the variation of the turbine speed (i.e., turbine rotation acceleration) appears as the fluctuation of the output torque. The slip amount is susceptible to the variation of the input torque of the torque converter in accordance with the variation of the throttle opening degree of the engine and the variation of the hydraulic pressure characteristics in accordance with the temperature change of the operation oil of the automatic transmission.

The aforementioned document describing the known hydraulic pressure control device for an automatic transmission mentions that the slip amount can be controlled by feedback control, but it is difficult to maintain in a stable manner the slip amount by the usual PI control. As particularly shown by the dashed line in FIG. 12(D), the increase of the hydraulic pressure applied to the engagement side frictional engagement element (i.e., transmitting torque) is delayed due to variations of the clutch stroke and the variation of the hydraulic pressure characteristic in accordance with the temperature change of the operation oil. As a result, as shown in FIGS. 12(A) and 12(B), a time TS during which the speed ratio has to be maintained within a predetermined range Δe becomes long. In this case, because the slip amount fluctuates high and low as shown in FIG. 12(B) and the possibility of the fluctuation of the output torque is increased as shown in FIG. 12(C), the shift change feeling is deteriorated.

A need thus exists for a hydraulic pressure control device for an automatic transmission which can smoothly vary the slip amount of the clutch to clutch shift control and maintain a preferable shift change feeling.

SUMMARY OF THE INVENTION

According to one aspect, a method of controlling an automatic transmission involves achieving a predetermined shift by maintaining a plurality of frictional engagement elements under an engagement condition or a disengagement condition by controlling hydraulic pressure applied to the frictional engagement elements, with the plurality of frictional engagement elements including a release side frictional engagement element and an engagement side frictional element, generating slip by reducing a transmission torque of the release side frictional engagement element by reducing the hydraulic pressure applied to the release side frictional engagement element which is under the engagement condition before a shift change and is changed to the disengagement condition after the shift change, and performing the shift change by increasing the transmission torque of the engagement side frictional element by increasing the hydraulic pressure applied to the engagement side frictional element which is under the disengagement condition before the shift change and is changed to the engagement condition after the shift change. A reference model is used having a behavior such that an output is determined to be a predetermined slip amount which smoothly varies over an elapse of time with respect to a target slip amount that varies in a stepped manner. The hydraulic pressure applied to the release side frictional engagement element is controlled using a controller which exhibits a behavior corresponding to the reference model by collaboration of a controlled object and the controller for which a hydraulic pressure applied to the release side frictional engagement element is determined to be an input and a slip amount of the automatic transmission is determined to be an output.

According to another aspect, a hydraulic pressure control device is provided in an automatic transmission that includes a plurality of frictional engagement elements adapted to be maintained under an engagement condition or a disengagement condition to achieve a predetermined shift by controlling hydraulic pressure applied to the frictional engagement elements, wherein the plurality of frictional engagement elements including a release side frictional engagement element and an engagement side frictional element, with slip being generated by reducing a transmission torque of the release side frictional engagement element through reduction of the hydraulic pressure applied to the release side frictional engagement element which is under the engagement condition before a shift change and is changed to the disengagement condition after the shift change, and with the shift change being performed by increasing the transmission torque of the engagement side frictional element through increase of the hydraulic pressure applied to the engagement side frictional element which is under the disengagement condition before the shift change and is changed to the engagement condition after the shift change. The hydraulic pressure control device includes a reference model exhibiting a behavior such that an output is determined to be a predetermined slip amount which smoothly varies over time relative to a target slip amount that varies in a stepped manner, and a controller which controls the hydraulic pressure applied to the release side frictional engagement element, the controller having a behavior corresponding to the reference model by collaboration of a controlled object and the controller for which a hydraulic pressure applied to the release side frictional engagement element is determined to be an input and a slip amount of the automatic transmission is determined to be an output.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
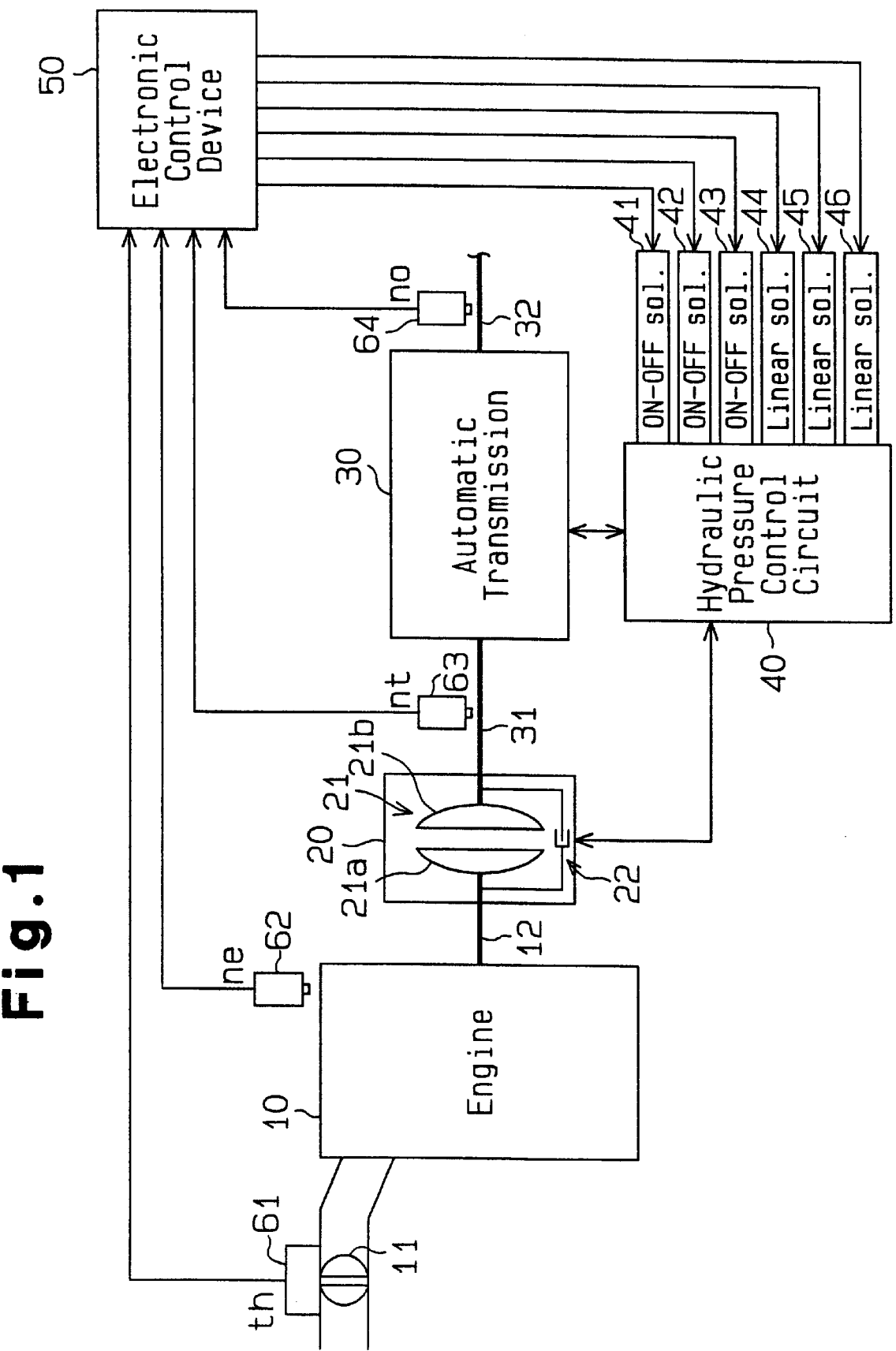
FIG. 1 is schematic illustration of a hydraulic pressure control device for an automatic transmission mounted on a vehicle according to one embodiment.

FIG. 1 shows a hydraulic pressure control device for an automatic transmission mounted on a vehicle. As shown in FIG, 1, the vehicle includes an engine 10, a hydraulic torque converter 20 with a lockup clutch, an automatic transmission 30, a hydraulic pressure control circuit 40 for controlling the hydraulic pressure supplied to the torque converter 20 and the automatic transmission 30, and an electronic control device 50 which provides control signals to the hydraulic pressure control circuit 40. The generated torque of the engine 10 that is increased and decreased through operation of a throttle pedal or acceleration pedal is transmitted to the driving wheels via the torque converter 20 provided with a lockup clutch, the automatic transmission 30, and a differential gear (not shown).

Figure 2:
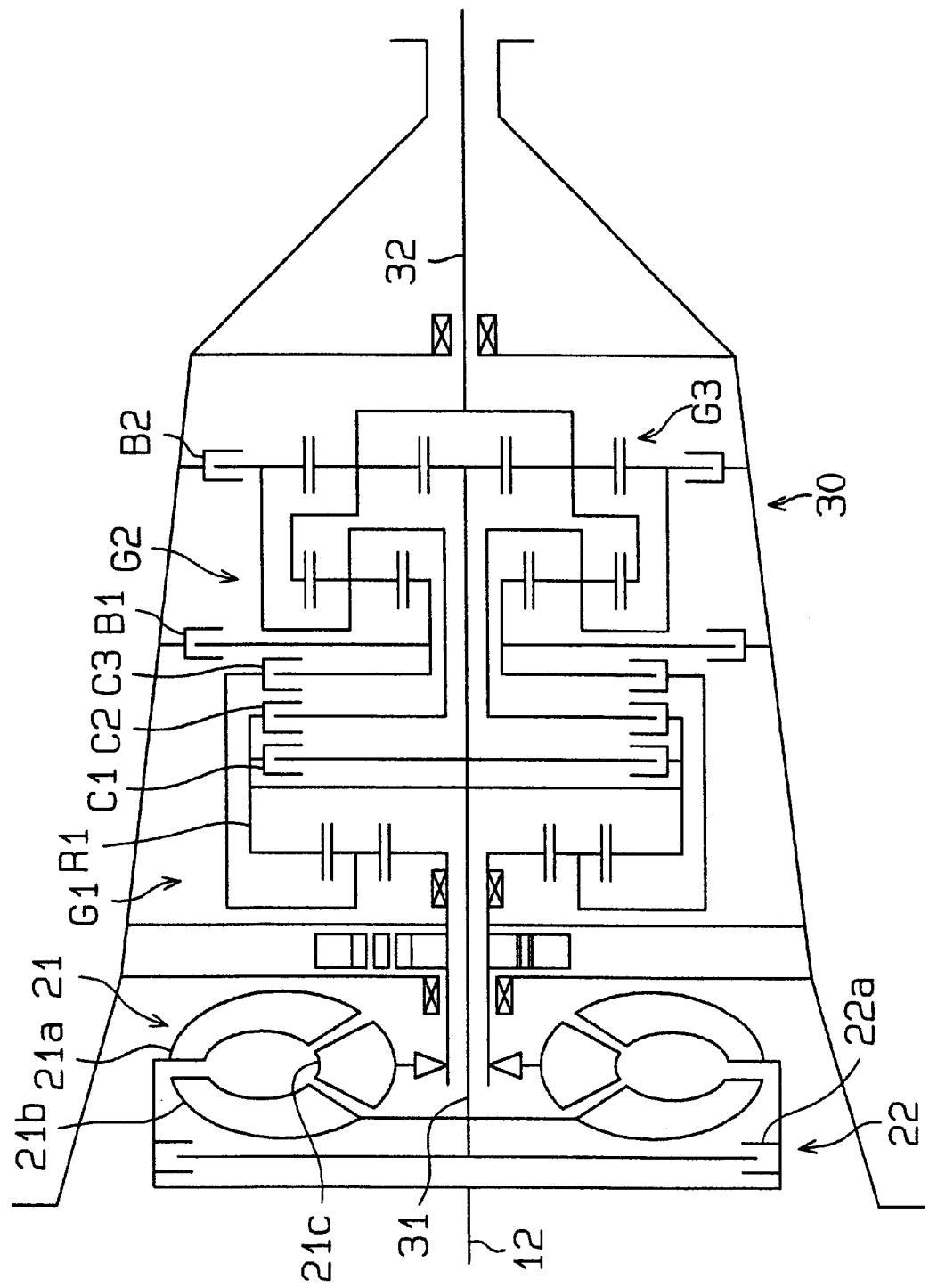
FIG. 2 is a schematic illustration of the automatic transmission construction shown in FIG. 1.

As shown in FIGS. 1 and 2, the torque converter 20 with the lockup clutch includes a hydraulic type transmission mechanism 21 for transmitting the torque generated by the engine 10 to the automatic transmission 30 via the fluid (i.e., operation oil) and a lockup clutch mechanism 22 connected in parallel with the hydraulic type transmission mechanism 21.

The hydraulic type transmission mechanism 21 includes a pump impeller 21a connected to a torque converter input shaft 12 which rotates as a unit with a crankshaft of the engine 10, a turbine impeller 21b connected to an input shaft 31 of the automatic transmission 30 and rotated by the flow of the operation oil generated by the pump impeller 21a, and a stator impeller 21c which is shown in FIG. 2.

As shown in FIG. 2, the lockup clutch mechanism 22 includes a lockup clutch 22a. The lockup clutch mechanism 22 achieves an engagement condition in which the torque converter input shaft 12 and the input shaft 31 of the automatic transmission 30 are mechanically connected via the lockup clutch 22a to be unitarily rotated together. The lockup clutch mechanism 22 also achieves a disengagement condition in which the mechanical connection of the torque converter input shaft 12 and the input shaft 31 of the automatic transmission 30 via the lockup clutch 22a is released. The engagement condition and disengagement condition are performed by the supply and the discharge of the operation oil by the connected hydraulic pressure control circuit 40.

The automatic transmission 30 for performing six forward shifts and one reverse shift includes a single pinion planetary gear G1 of the first line having a ring gear R1, a singe pinion planetary gear G2 of the second line, a single pinion planetary gear G3 of the third line, frictional clutches C1, C2, C3, and frictional brakes B1, B2. The relationship between the engagement condition and disengagement condition of each frictional engagement element of the automatic transmission 30 and the performed shift is as shown in the following Table 1. In Table 1, a circle identifies the engagement condition and a blank identifies the disengagement condition.

TABLE 1

|  | C1 | C2 | C3 | B1 | B2 |
|---|---|---|---|---|---|
| First Shift Speed | ○ |  |  |  | ○ |
| Second Shift Speed | ○ |  |  | ○ |  |
| Third Shift Speed | ○ |  | ○ |  |  |
| Fourth Shift Speed | ○ | ○ |  |  |  |
| Fifth Shift Speed |  | ○ | ○ |  |  |
| Sixth Shift Speed |  | ○ |  | ○ |  |
| Reverse |  |  | ○ |  | ○ |

As shown in FIG. 1, the hydraulic pressure control circuit 40 includes three ON-OFF solenoid valves 41, 42, 43 and three linear solenoid valves 44, 45, 46 controlled by the control signal from the electronic control unit 50. The supply and discharge of the operation oil relative to the lockup clutch mechanism 22 and the frictional engagement elements of the automatic transmission 30 are controlled based on the operational combination of the ON-OFF solenoid valves 41, 42, 43. The hydraulic pressure of the operation oil supplied to and discharged from the lockup clutch mechanism 22 and the frictional engagement elements of the automatic transmission 30 through actuation of the linear solenoid valves 44, 45, 46 is modulated within a range under the line pressure.

The electronic control unit 50 corresponds to a microcomputer including a CPU, various memories (ROM, RAM), and an interface. The electronic control unit 50 is connected with a throttle opening degree sensor 61, an engine revolution speed sensor 62, a turbine speed sensor 63, and an output rotation speed sensor 64. Signals from the sensors 61, 62, 63, 64 are inputted to the electronic control unit 50.

The throttle opening degree sensor 61 detects the opening degree of a throttle valve 11 that is provided in the intake passage of the engine 10 and adapted to be opened and closed in accordance with the operation of the throttle pedal or acceleration pedal. The throttle opening degree sensor 61 generates a signal representing a throttle opening degree "th." The engine revolution speed sensor 62 detects the revolution speed of the engine 10 and generates a signal representing the engine rotation speed "ne." The turbine speed sensor 63 detects the rotation speed of the input shaft 31 of the automatic transmission 30 and generates a signal representing the turbine speed "nt." The output shaft rotation sensor 64 detects the rotation speed of the output shaft 32 of the automatic transmission 30 (i.e., the output rotation speed) and generates a signal representing the output shaft rotation speed (i.e., a value proportional to the vehicle speed) "no."

The electronic control unit 50 memorizes or has stored therein a shift change map and a lockup clutch operation map structured with the output shaft rotation speed "no" and the throttle opening degree "th". When a point determined by the detected output shaft rotation speed "no" and the detected throttle opening degree "th" crosses shift lines shown on the shift change map or in accordance with whether the point determined by the output shaft rotation speed "no" and the detected throttle opening degree "th" is within a lockup region of the lockup clutch operation map, the ON-OFF solenoid valves 41, 42, 43 of the hydraulic pressure control circuit 40 are controlled. With this structure, the linear solenoid valves 44, 45, 46 are controlled to change the engagement condition/disengagement condition of the frictional engagement elements as shown in Table 1 and to change the engagement condition/disengagement condition of the lockup clutch 22a.

The clutch-to-clutch shift control of the automatic transmission hydraulic pressure control device constructed as described above is as follows, referring to the situation when the shift change is performed from the second shift speed to the third shift speed.

An overview of the hydraulic pressure control at the shift change from the second shift speed to the third shift speed will be explained with reference to FIG. 3. When the point determined by the output shift rotation speed "no" and the throttle opening degree "th" crosses a shift-up line, the electronic control unit 50 performs a release initial ramp control for suddenly reducing the hydraulic pressure (hereinafter referred to as release side hydraulic pressure) relative to the release side frictional engagement element (i.e., brake B1 in this case) from the line pressure PL at the time t1. The release side frictional engagement element starts slipping at time t3. Then, the electronic control unit 50 performs a slip feedback control which will be explained in detail below. Accordingly, the slip amount is smoothly increased during the time t3–t4.

On the other hand, the electronic control unit 50 performs a pre-charge for suddenly increasing the hydraulic pressure (hereinafter referred to as engagement side hydraulic pressure) relative to the engagement side frictional engagement element (i.e., clutch C3 in this case) for a predetermined time from the time t1. The pre-charge control is competed at the time t2. Then the electronic control unit 50 performs an engaged waiting pressure control for maintaining the engagement side hydraulic pressure at a constant value until the start of the slip. When the slip is started at the time t3, a ramp pressure increase control is started for gradually increasing the engagement side hydraulic pressure along with the elapse of time. Thus, the engagement side frictional engagement element starts transmitting the torque at the time t4 to start reducing the slip amount. In this case, because the electronic control unit 50 tries to maintain the slip amount to be a target value by the slip feedback control, the release side hydraulic pressure is decreased in order to increase the slip amount.

When the slip amount becomes zero at the time t5 after continuing the foregoing condition, the electronic control unit 50 performs a ramp release control for reducing the release side hydraulic pressure along with the elapse of time, controls the engagement side hydraulic pressure so that a change ratio Δnt of the turbine speed "nt" becomes a target rotation change ratio ΔMNT, increases the engagement side hydraulic pressure to the line pressure PL when the turbine speed "nt" corresponds to the product of the gear ratio after shift change (i.e., the third shift speed in this case) and the output shaft rotation speed "no", and determines the release side hydraulic pressure to be zero. In this way, the shift change is completed.

Figure 4:
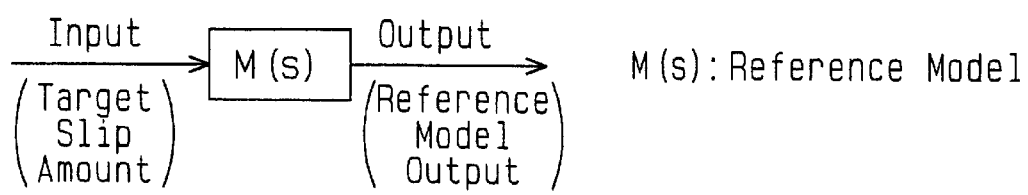
FIG. 4 is a block diagram of a reference model applied to the automatic transmission hydraulic pressure control device of FIG. 1.
Figure 5:
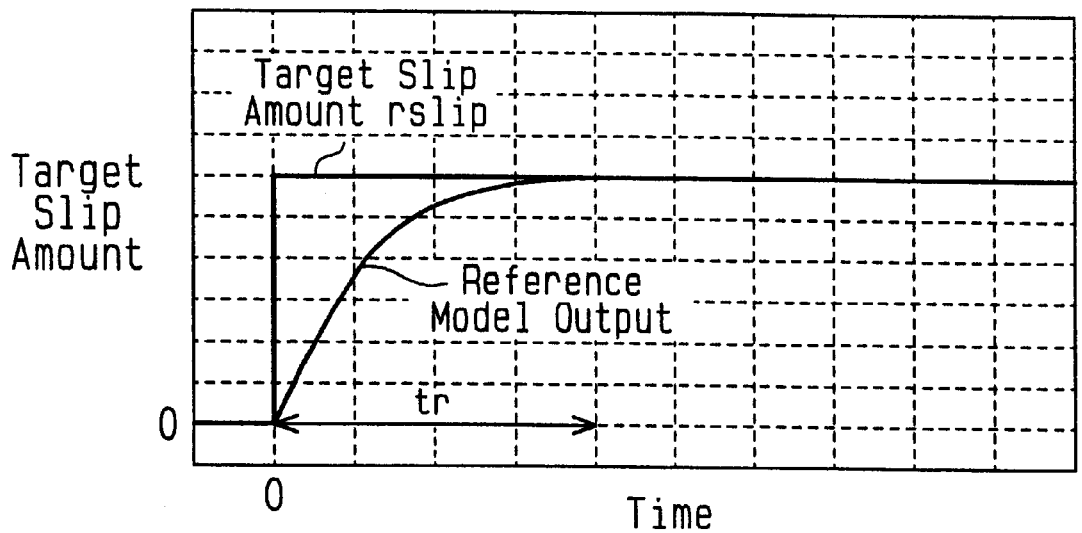
FIG. 5 is a time chart showing a target slip amount inputted into the reference model shown in FIG. 4 and the output relative to the input.

The principles of the feedback control at the time t3–t5 are as follows. First, a reference model M(s) is determined as shown in FIG. 4. Then, a transfer function of the reference model M(s) is determined using a binomial model so that the reference model M(s) shows a response (i.e., behavior) smoothly reaching a target slip amount rslip after elapse of a time constant "tr" relative to the target slip amount rslip which is varied in a stepped manner as shown in FIG. 5. Accordingly, the reference model M(s) will be according to the following Formula 1. In this case, "s" refers to a differential operator.

$$M(s) = rslip/(tr \cdot s + 1)^2 \qquad \text{Formula 1}$$

Figure 6:
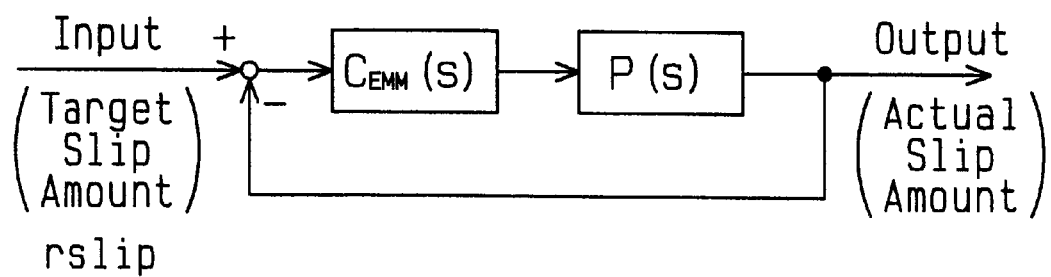
FIG. 6 is a block diagram showing a connecting relationship of a controlled object of the automatic transmission hydraulic pressure control device of FIG. 1 and a controller applied thereto.
Figure 7:
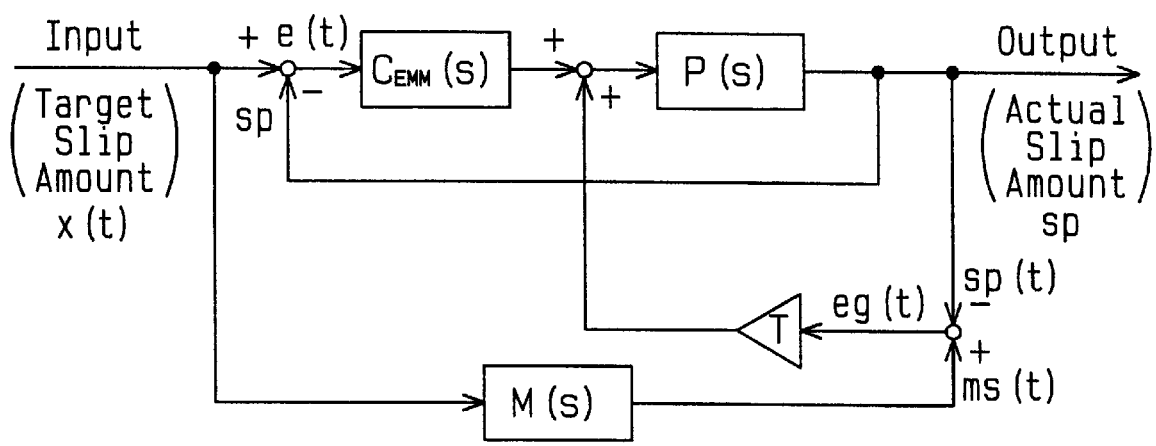
FIG. 7 is a block diagram of the automatic transmission hydraulic pressure control device of FIG. 1.

Next, as shown in FIG. 6, a closed loop system for performing the feedback control of a controlled object P(s) using a controller (i.e., feedback controller) $C_{EMM}(s)$ will be considered. The controller $C_{EMM}(S)$ is obtained using a complete model matching method so that an output when providing the target slip amount rslip as an input to the closed loop system corresponds to the output of the reference model M(s). In practice, a Formula 2 noted below is obtained from FIG. 6, a Formula 3 noted below for obtaining the controller $C_{EMM}(s)$ is obtained from Formula 2, and the controller $C_{EMM}(s)$ is determined by Formula 3 and Formula 1.

$$M(s) = C_{EMM}(s) \cdot P(s) / \{1 + C_{EMM}(s) \cdot P(s)\} \qquad \text{Formula 2}$$

$$C_{EMM}(s) = M(s) / \{1 - M(s)\} \cdot P(s) \qquad \text{Formula 3}$$

The controlled object P(s) is determined by a system identification method by determining the input as the release side hydraulic pressure (i.e., the engagement pressure of the brake B1) and the output as an actual slip amount "sp". The controlled object P(s) is represented by polynomials of the differential operator "s". By controlling the release side hydraulic pressure using the controller $C_{EMM}(s)$ obtained in the foregoing manner, the actual slip amount "sp" is smoothly increased like the output of the reference model. Accordingly, the fluctuation of the output torque of the automatic transmission 30 is controlled to be restrained.

According to this described embodiment, as shown in FIG, 7, a difference (i.e., model error amount) eg (t) between an output ms (t) of the reference model M(s) relative to the target slip amount (x(t)=rslip) and an output of the closed loop including the controller $C_{EMM}(s)$, that is the actual slip amount sp(t) is obtained. Then, the product of the difference eg(t) and a gain T is returned to the input of the controlled object P(s). That is, the feedback of the model error amount eg (t) is performed.

Accordingly, the transmission is not as likely to be influenced by the disturbance (i.e., deviation of the controlled object P(s)) derived from variations such as the clutch stroke and the hydraulic pressure control valve characteristics, the hydraulic characteristic fluctuation by the variation in the oil temperature, and the change due to wear of the frictional engagement element and the degradation of the oil.

Figure 8:
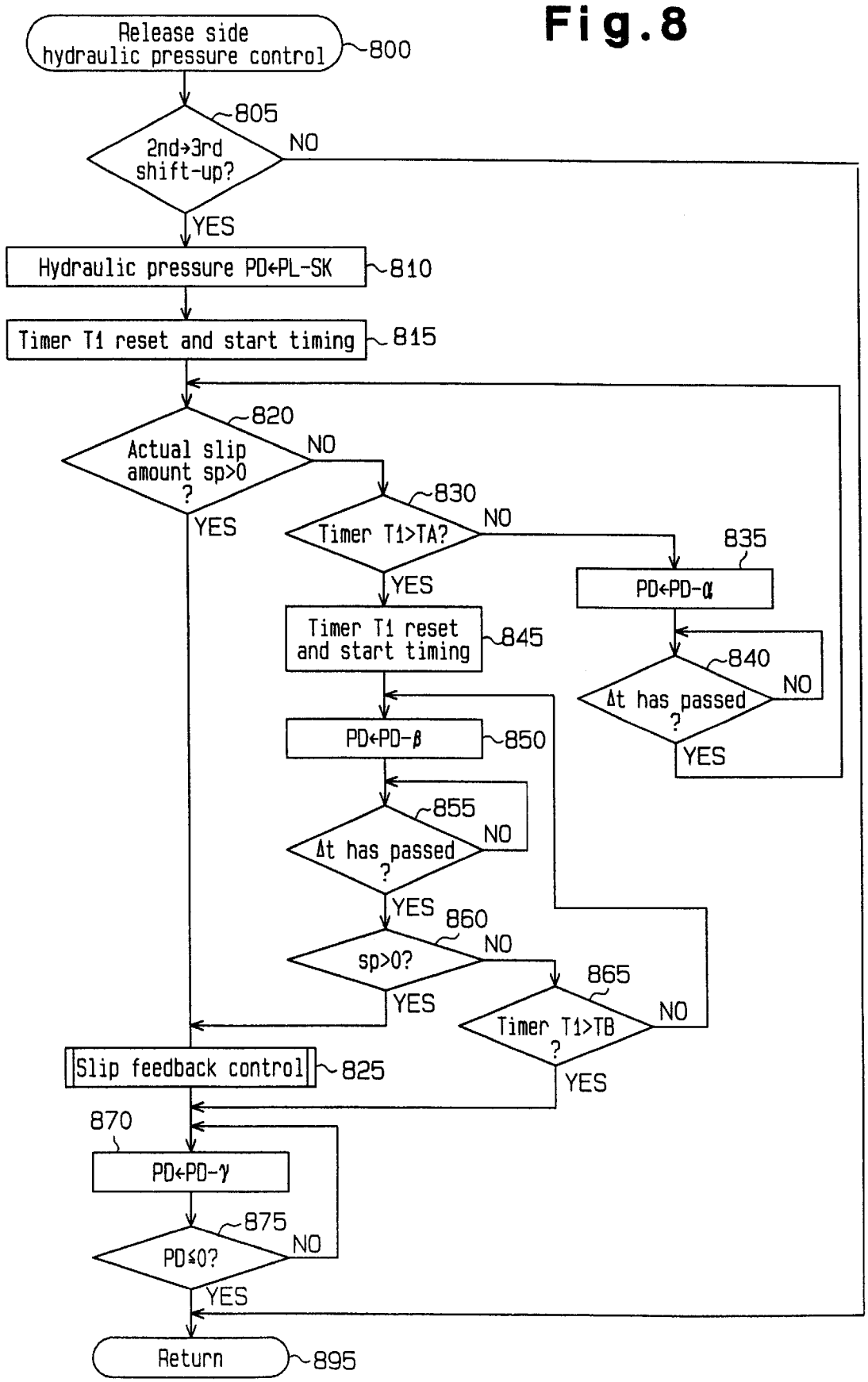
FIG. 8 is a flowchart of a program or routine carried out by a CPU of the electronic control device shown in FIG. 1 for carrying out release side hydraulic pressure control.

The operation of the hydraulic pressure control device for an automatic transmission with respect to the shift change from the second shift speed to the third shift speed in practice is as follows. The CPU of the electronic control unit 50 repeatedly carries out a release side hydraulic pressure control routine shown by the FIG. 8 flowchart every predetermined period of time. The CPU starts the program beginning with Step 800 at a predetermined timing. In Step 805, it is judged whether it is the appropriate timing for shifting up from the second speed shift to the third speed shift based on whether the point determined by the output shift rotation speed "no" and the throttle opening degree "th" has crossed the shift-up line from the second speed shift to the third speed shift shown on the shift change map. In this case, when it is not the appropriate time for the shift up from the second speed shift to the third speed shift, the CPU determined NO in Step 805. Then, the transaction advances to Step 895 to complete the routine.

On the other hand, when it is determined in Step 805 to be the appropriate time for the shift up from the second speed shift to the third speed shift, the CPU determines YES in Step 805 and the program advances to Steps 810–865. Following Step 805, the release initial ramp control is started in Step 810. In Step 810, the CPU determines the hydraulic pressure of the release side hydraulic pressure PD (i.e., the release side hydraulic pressure) to be a value derived by subtracting a predetermined pressure SK from the line pressure PL. Thus, the linear solenoid valve 44 is actuated to reduce the release side hydraulic pressure by the predetermined pressure SK (i.e., referring to the time t1 of FIG. 3).

Next, in Step 815, the CPU resets a timer T1 and starts timing (i.e., starts the timer T1). Then, it is judged in Step 820 whether the actual slip amount "sp" is greater than zero (i.e., whether the slip has started). The actual slip amount "sp" is obtained from the following Formula 4 in which the value G1 stands for the gear ratio before the shift change (i.e., the gear ratio of the second speed shift in this case).

$$sp = nt - no \cdot G1 \qquad \text{Formula 4}$$

When slip has been generated at this phase, the CPU determines YES in Step 820 and the program advances to Step 825 to carry out the slip feedback control. When the slip has not been generated at this phase, the CPU determines NO in Step 820 and the routine advances to Step 830 to judge whether the value of the timer T1 is greater than a predetermined value TA. At this moment, because it is immediately after starting of the timing, the value of the timer T1 is less than the predetermined value TA. Thus, the CPU determines NO in Step 830 and the program advances to Step 835 to reduce the release side hydraulic pressure PD by a predetermined value α. Then in Step 840, the program returns to Step 820 after the elapse of the time Δt after the execution of Step 835. In this way, the release side hydraulic pressure PD is reduced by the predetermined value α every time Δt by the CPU and the start of the slip is monitored in Step 820. Accordingly, when the slip is generated before the value of the timer T1 becomes greater than the predetermined value TA, the CPU determines YES in Step 820 and the program advances to Step 825 (i.e., referring to the time t3 in FIG. 3).

the other hand, when the slip has not generated before the value of the timer T1 becomes greater than the predetermined value TA, the CPU determines YES in Step 830 and the routine advances to Step 845 to reset the timer T1 and to restart timing. Then, the program advances to Step 850 to reduce the release side hydraulic pressure PD by a predetermined value β which is smaller than the predetermined value α. Next, in Step 855, the elapse of the time Δt after execution of Step 850 is awaited. Once the time 66 t has passed, the program proceeds to Step 860 where it is judged whether the actual slip amount "sp" is greater than zero.

When the slip has been generated at this phase, the CPU determines YES in Step 860 and the program advances to Step 825. On the other hand, when the slip has not been generated at this phase, the CPU determines NO in Step 860 and the routine is advanced to Step 865 to determine whether the timing T1 is greater than the predetermined value TB. At this point, because it is immediately after the start of the timing in Step 845, the value of the timer T1 is determined to be less than the predetermined value TB. Accordingly, the CPU determines NO in Step 865 and the program returns to Step 850. With this operation, the CPU reduces the release side hydraulic pressure PD by the predetermined value β every time Δt and monitors the start of the slip in Step 860. Thus, when the slip is generated before the value of the timer T1 becomes greater than the predetermined value TB, the CPU determines YES in Step 860 and the program is advanced to Step 825.

Figure 9:
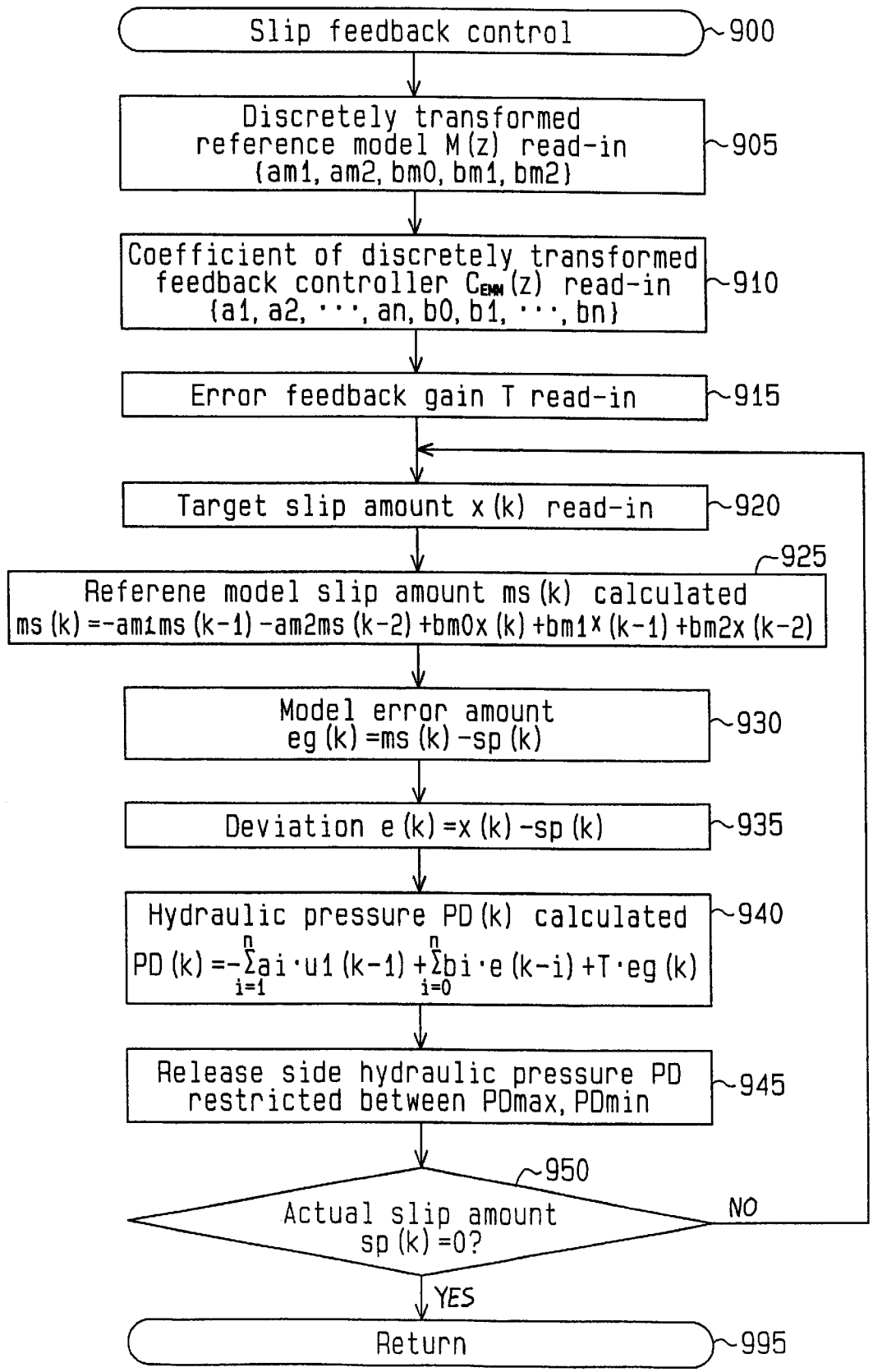
FIG. 9 is a flowchart of a subprogram or subroutine carried out by the CPU of the electronic control device shown in FIG. 1 for performing the slip feedback control operation shown in the program or routine of FIG. 8.

In Step 825, the CPU starts the slip feedback control routine shown in FIG. 9 from Step 900. In Step 905, a coefficient of a discretely transformed reference model M(z) {am1, am2, bm0, bm1, bm2} is read in. Then in Step 910 the CPU reads in the coefficient of the reference model M(z) of the feedback controller $C_{EMM}$ (Z) which is discretely transformed {a1, a2 . . . an, b0, b1, b2 . . . bn; where "n" corresponds to the order of $C_{EMM}$ (Z)}. Then, in Step 915, an error feedback gain T is read-in.

Following this, in Step 920, the CPU reads in a target slip amount x (k). Then, in Step 925 a reference model slip amount ms (k) which corresponds to the output of the discretely transformed reference model M(z) (i.e., equal to −am1·ms (k−1)−am2·ms(k−2)+bm0·x(k)+bm1·x (k−1)+ bm2·x (k−2)) is obtained; wherein "k" stands for the time of every calculation cycle of the CPU.

In the following Step 930, the CPU subtracts the actual slip amount sp (k) from the reference model slip amount ms (k) to obtain a model error amount eg (k). Then in Step 935, the CPU subtracts the actual slip amount sp (k) from the target slip amount x (k) to obtain a deviation e (k). Then, the CPU obtains a release side hydraulic pressure PD (k) in Step 940. Theoretically, the hydraulic pressure PD (k) can be obtained as the sum of an output u1 (t) of a controller $C_{EMM}$ (t) and the product of a model error amount eg (t) and the error feedback gain T. In practice, the release side hydraulic pressure PD (k) is obtained based on the output of the discretely transformed controller $C_{EMM}$ (z) having the coefficient which is read in Step 910 shown as the following Formula 5, the gain T, and the model error amount eg(k).

$$C_{EMM}(z) = -\sum_{i=1}^{n} ai \cdot u1(k-i) + \sum_{i=0}^{n} bi \cdot e(k-i) \quad \text{Formula 5}$$

In Step 945, the CPU restricts the release side hydraulic pressure PD between a maximum value PDmax and a minimum value PDmin. In Step 950, it is judged whether the actual slip amount "sp" has become zero. Because it is immediately after starting of the slip at this phase and the supplied hydraulic pressure relative to the engagement side frictional engagement element is relatively small, the engagement side frictional engagement element has not started the torque transmission. Because the actual slip amount is greater than zero, the CPU determines NO in Step 950 and the program is returned to Step 920. The CPU repeatedly carries out Steps 920–950 until the actual slip amount "sp" becomes zero.

With the slip feedback control performed in the foregoing manner, the actual slip amount "sp" is smoothly increased to approximately correspond to the output of the reference model M(s). Accordingly, high and low fluctuations of the output torque of the automatic transmission is small and the preferable shift change feeling can be obtained.

Figure 10:
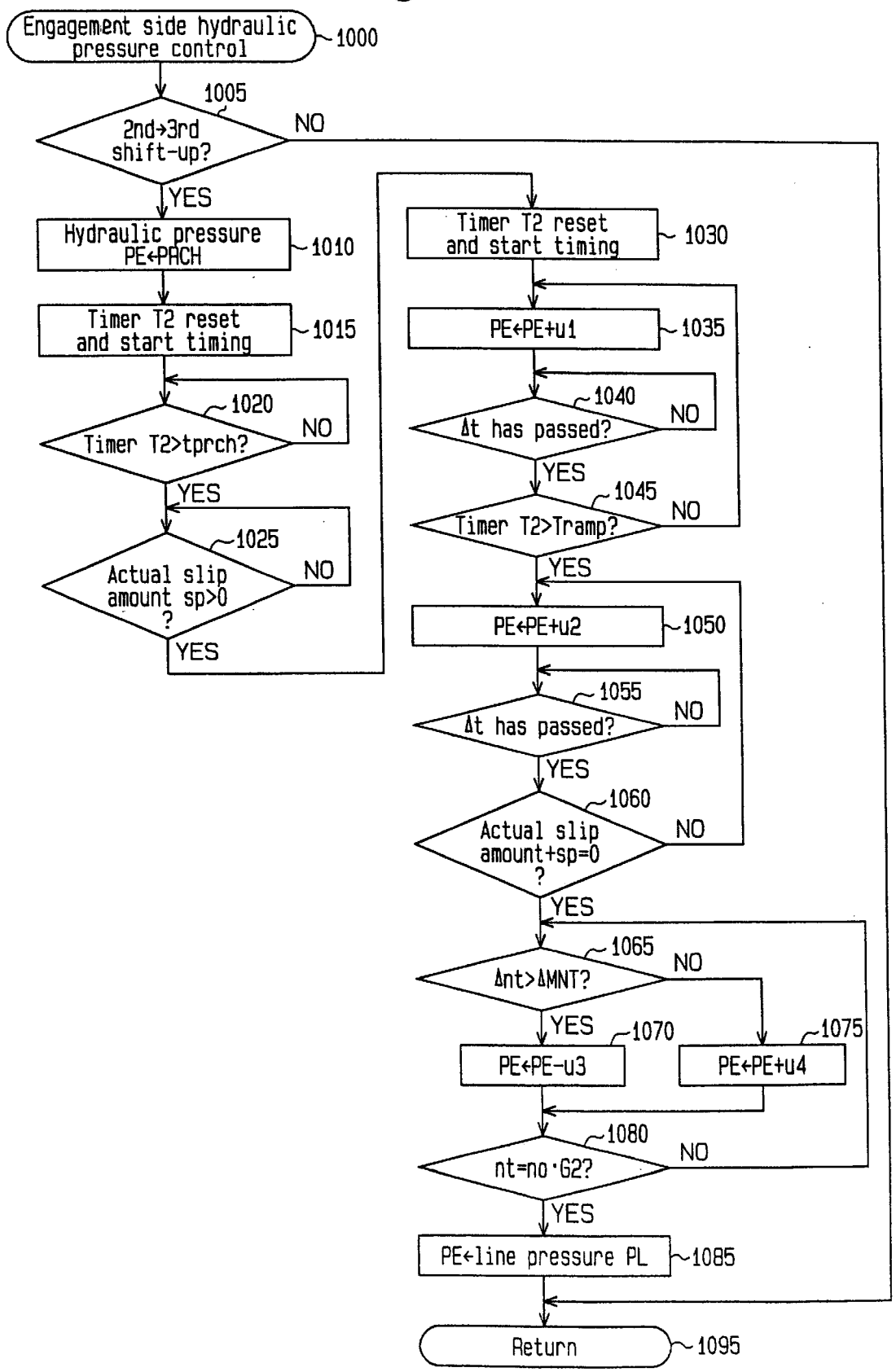
FIG. 10 is a flowchart of a program or routine carried out by a CPU of an electronic control device of FIG. 1 for carrying out engagement side hydraulic pressure control.

The CPU of the electronic control unit 50 also carries out an engagement side hydraulic pressure control routine shown in the flowchart of FIG. 10 every predetermined time. The transaction is started from Step 1000 at a predetermined timing. In Step 1005, it is determined whether it is appropriate timing for shifting up from the second speed shift to the third speed shift in a manner similar to Step 805. When it is determined that it is not the appropriate timing for shifting up from the second speed shift to the third speed shift, the CPU determines NO in Step 1005 and the program advances to Step 1095. In Step 1095, the engagement side hydraulic pressure control routine is completed.

When it is determined in Step 1005 to be the appropriate shift up timing from the second speed shift to the third speed shift, the CPU determines YES in Step 1005 and the program advances to Step 1010. In Step 1010, in order to perform the pre-charge control, the engagement side hydraulic pressure PE is predetermined to be a predetermined pre-charge pressure PRCH. Thus, the engagement side hydraulic pressure is increased and the oil is filled as shown at t1–t2 in FIG. 3. Then, the CPU resets a timer T2 for starting the timing (i.e., the timer T2 is started) in Step 1015. In Step 1020, it is determined whether the value of the timer T2 is greater than a predetermined value tprch. So long as the value of the timer T2 is less than the predetermined value tprch, Step 1020 is repeatedly carried out.

When the value of the timer T2 becomes greater than the predetermined value tprch, the CPU monitors whether the actual slip amount "sp" has become greater than zero in Step 1025. As mentioned above, the release side hydraulic pressure has been reduced at this phase, and the slip is generated at t3 of FIG. 3. Thus, the CPU determines YES in Step 1025 and the program advances to Step 1030. In Step 1030, the value of the timer T2 is reset to restart the timing. Then, the CPU carries out a ramp pressure increase control for gradually increasing the engagement side hydraulic pressure in Steps 1035–1060.

That is, the CPU increases the value of the engagement side hydraulic pressure PE by the predetermined value u1 in Step 1035, advances to Step 1045 after waiting for the elapse of the time Δt after the execution of Step 1035, and judges in Step 1045 whether the value of the timer T2 is greater than a predetermined value Tramp. Because it is immediately after the starting of the timing by the timer T2, the value of the timer T2 is less than the predetermined value Tramp. Thus, the CPU determines NO in Step 1045 and the program is returned to Step 1035. With this operation, the CPU increases the engagement side hydraulic pressure PE by the predetermined value u1 every time Δt until the value of the timer T2 becomes greater than the predetermined value Tramp.

When the value of the timer T2 becomes greater than the predetermined value Tramp after the elapse of the predetermined time, the CPU determines YES in Step 1045. Then, in Step 1050, the CPU increases the value of the engagement side hydraulic pressure PE by a predetermined value u2 which is greater than the predetermined value u1. The program then advances to Step 1060 after waiting for the elapse of the time Δt after the execution of Step 1050. In Step 1060, the CPU judges whether the actual slip amount "sp" has become zero. When the actual slip amount is not zero, the CPU determines NO in Step 1060 and the program is returned to Step 1050. With this operation, the CPU increases the engagement side hydraulic pressure by the predetermined value u2 every time Δt. Accordingly, the engagement side frictional engagement element starts the torque transmission after the elapse of the predetermined time and the slip amount starts to be reduced (i.e., time t4 in FIG. 3).

Figure 3:
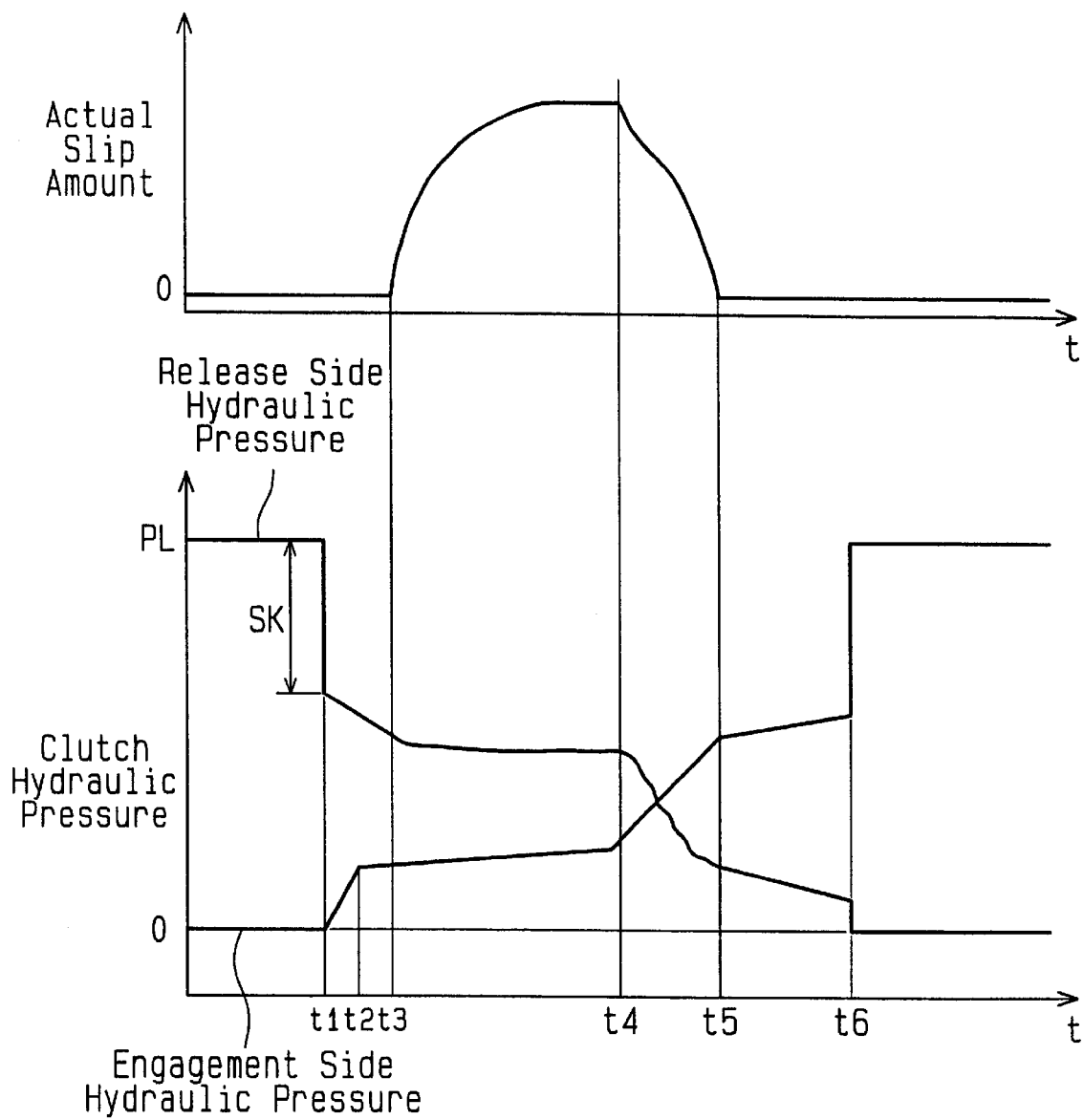
FIG. 3 is a time chart showing the actual slip amount, the release side hydraulic pressure, and the engagement side hydraulic pressure when a shift change is performed from the second shift speed to the third shift speed with the automatic transmission hydraulic pressure control device shown in FIG. 1.

During the period from the time t3 to the time t4, the release side hydraulic pressure is controlled by the slip feedback control by the controller $C_{EMM}$ (S). Because the feedback control is for controlling the release side hydraulic pressure in order to maintain the slip amount at the target value, when the slip amount starts becoming reduced after the time t4 in FIG. 3, the release side hydraulic pressure (i.e., the release side hydraulic pressure PD) is reduced in order to increase the slip amount.

shown at the time t5 in FIG. 3, when the actual slip amount becomes zero, the CPU controls the engagement side hydraulic pressure so that the change ratio Δnt of the turbine speed "nt" is to be a target rotation change ratio ΔMNT in order to complete the torque phase and to transition to the inertia phase. In Step 1060, the CPU determines YES and the program advances to Step 1065. In Step 1065, it is judged whether the change ratio Δnt of the turbine speed "nt" is greater than the target rotation change ratio ΔMNT. When the change ratio Δnt is greater than the target rotation change ratio ΔMNT, the engagement side hydraulic pressure PE is reduced by a predetermined value u3 in Step 1070. When the change ratio Δnt is less than the target rotation change ratio ΔMNT, the engagement side hydraulic pressure PE is increased by a predetermined value u4 in Step 1075. Thus, the change ratio Δnt approximately corresponds to the target rotation change ratio ΔMNT.

Step 1080, the CPU judges whether the turbine speed "nt" corresponds to the product of the gear ratio G2 of the third speed shift after the shift change and the output shaft rotation speed "no". When the turbine speed "nt" does not correspond to the product of the gear ratio G2 of the third speed shift after the shift change and the output shaft rotation speed "no", the program returns to Step 1065. When the turbine speed "nt" corresponds to the product of the gear ratio G2 of the third speed shift after the shift change and the output shaft rotation speed "no", the CPU determines YES in Step 1080 and the program advances to Step 1085. In Step 1085, the engagement side hydraulic pressure PE is determined as the line pressure PL, and this routine is completed in Step 1095.

As shown by the time t5 in FIG. 3, when the actual slip amount becomes zero, the CPU determines YES in Step 950 of FIG. 9. The CPU then carries out Steps 870, 875 in FIG. 8 to reduce the release side hydraulic pressure PD by a predetermined value γ until the release side hydraulic pressure PD becomes less than zero. When the release side hydraulic pressure PD becomes less than zero, the CPU judges YES in Step 875 and the program advances to Step 895. The shift change is thus completed in the foregoing manner. According to the release side hydraulic pressure control of FIG. 8, when the slip is not generated before the value of the timer T1 becomes greater than the predetermined value TB, the CPU determines YES in Step 865 and the routine is advanced to Step 870. It is considered that the sudden increase of the turbine speed "nt" is not caused even if the release side hydraulic pressure is suddenly decreased without generating the slip since the slip is not generated irrespective of sufficient reduction of the release side hydraulic pressure.

As described above, in accordance with the described embodiment of the automatic transmission hydraulic pressure control device, the controller $C_{EMM}$ (s) is determined using the complete model matching method so that the change of the actual slip amount over time corresponds to the output of the reference model M(s) and the slip feedback control is performed using the controller $C_{EMM}$ (s). Accordingly, even when the increased transmitting torque by the engagement side frictional engagement elements is delayed from the predetermined timing by virtue of variations in the clutch stroke of the engagement side frictional engagement elements and the change of the hydraulic pressure characteristics, the slip amount can be smoothly varied and the sudden increase of the turbine speed "nt" can be prevented. Thus, the preferable shift change feeling is maintained. Moreover, because the feedback is performed after obtaining the model error amount eg (k), shift change control influenced by disturbances due to the change of the input torque, the characteristics fluctuation of the system because of the temperature change of the oil, and characteristic change of the system because of changes such as wear of the clutch and degradation of the oil can be performed.

Figure 11:
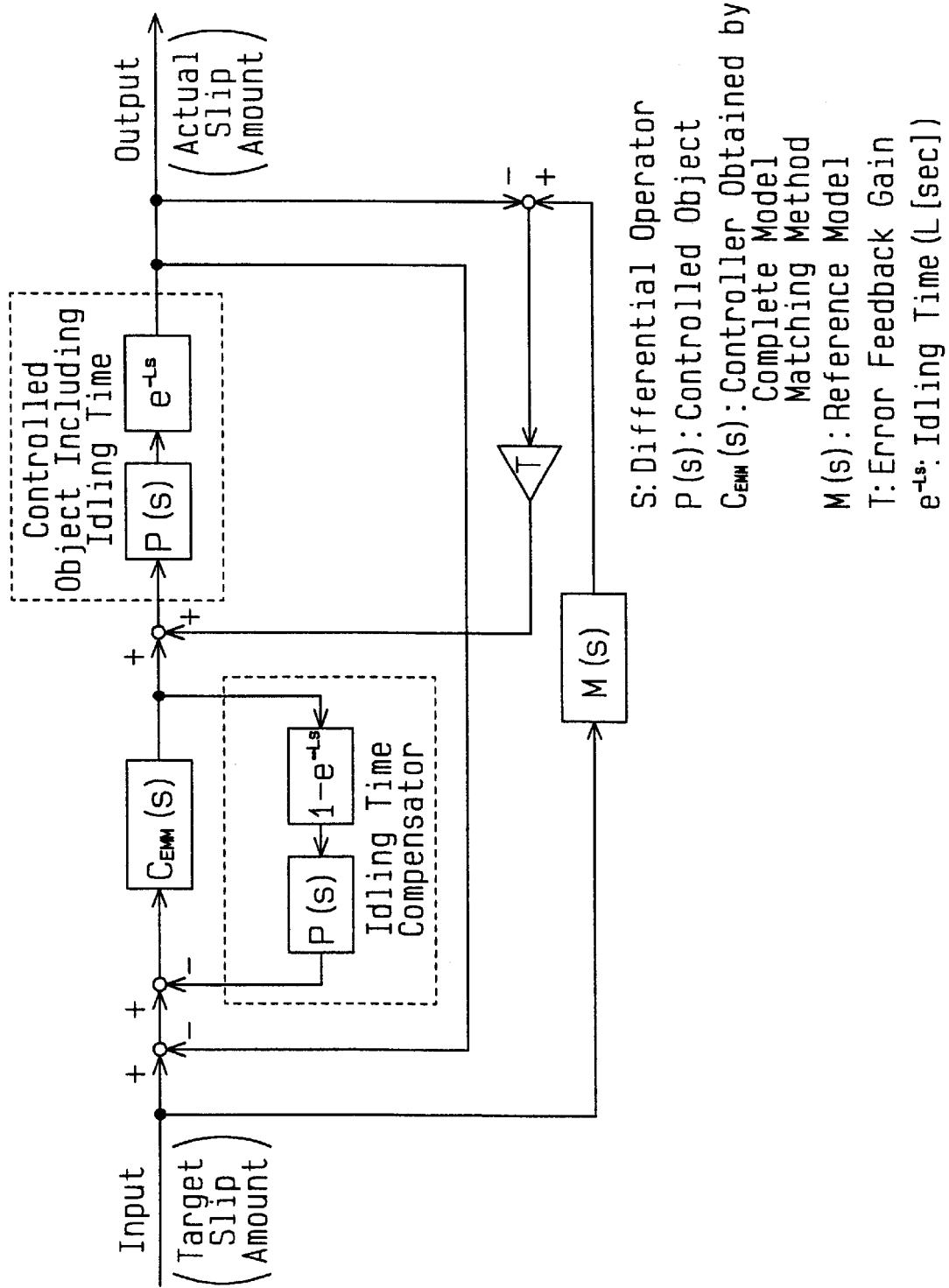
FIG. 11 is a block diagram of another embodiment of the hydraulic pressure control device for an automatic transmission.
Figure 12:
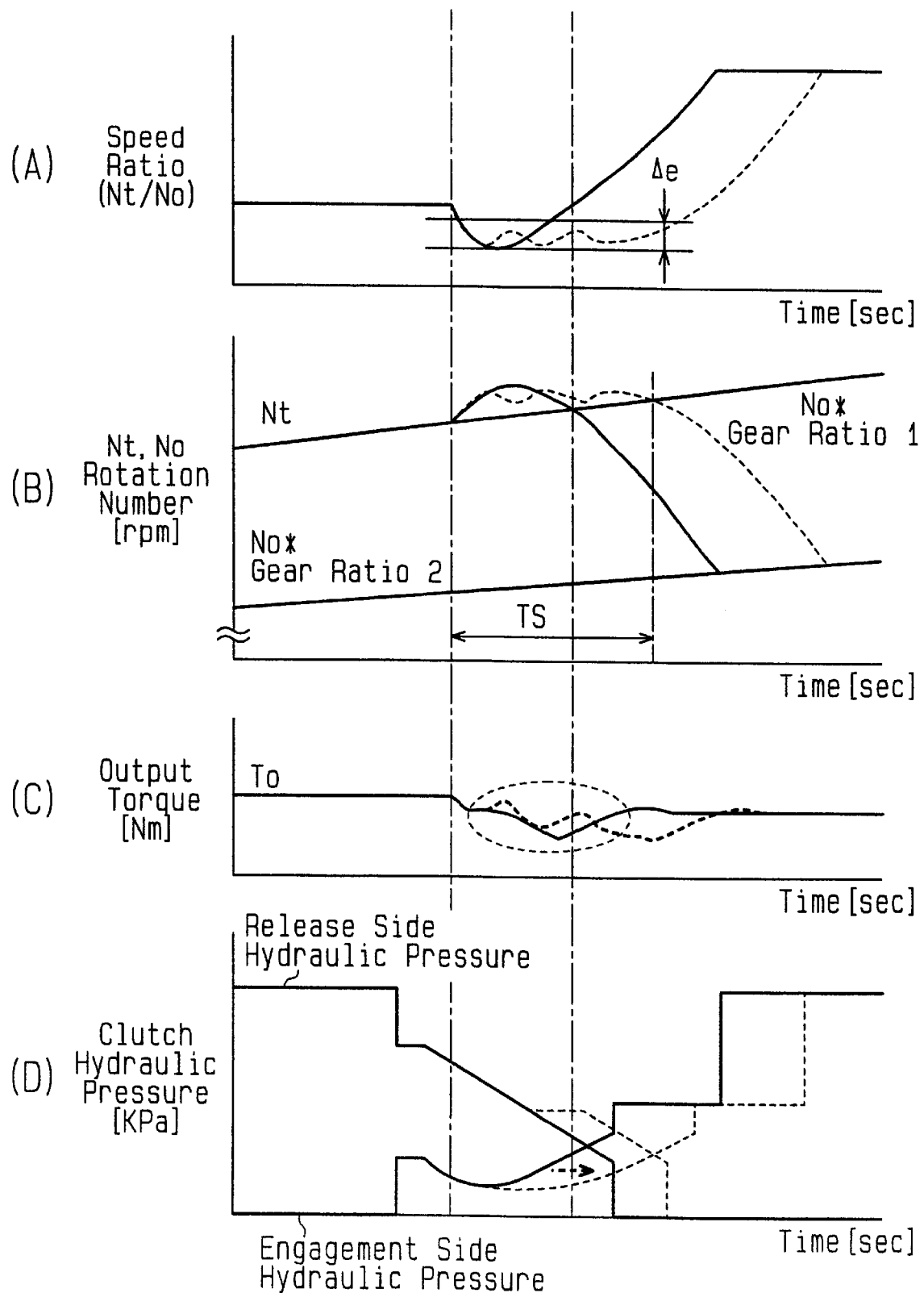
FIG. 12 is a time chart showing the speed ratio, the turbine speed, the output shaft rotation speed, the output torque, the release side hydraulic pressure, and the engagement side hydraulic pressure at shift change according to a known hydraulic pressure control device for an automatic transmission.

Another embodiment of the hydraulic pressure control device for an automatic transmission is explained below. Because the hydraulic pressure is applied to the automatic transmission, the feedback control can be performed more precisely when considering the response delay (i.e., idling time) of the hydraulic pressure system. As shown in FIG. 11, the controlled object including the idling time is shown as Formula 6. An idling time compensator H(s) shown as Formula 7 is added to the controller $C_{EMM}$(S).

$$P'(s)=P(s)\cdot e^{-LS} \qquad \text{Formula 6}$$

$$H(s)=P(s)\cdot(1-e^{-LS}) \qquad \text{Formula 7}$$

As explained above, with the disclosed hydraulic pressure control device for an automatic transmission, the slip amount according to the clutch-to-clutch shift control of the automatic transmission is smoothly varied in correspondence to the behavior of the reference model and so the fluctuation of the slip amount becomes relatively smaller. Thus, the preferable shift change feeling can be maintained.

The influence of disturbances such as clutch wear and changes over time, the manufacturing variations such as associated with the characteristics of the hydraulic pressure control valve, the variation of the input torque, and the characteristic fluctuations by virtue of the temperature change of the oil appear as an error between the reference model output and the actual output. Thus, it is preferable that the hydraulic pressure applied to the release side frictional engagement element is controlled by performing the feedback of the error between the output of the reference model when the target slip amount is applied to the reference model and the actual output when the target slip amount is applied to the system including the controlled object and the feedback controller. With the automatic transmission hydraulic pressure control device described above, by controlling the hydraulic pressure relative to the release side frictional engagement element using the error, the shift control influenced by disturbances and variations can be achieved.

In addition, by providing the idling time compensator to the feedback controller, the shift change control which is influenced by the response delay of the hydraulic pressure system can be achieved.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method of controlling an automatic transmission comprising:

achieving a predetermined shift by maintaining a plurality of frictional engagement elements under an engagement condition or a disengagement condition by controlling hydraulic pressure applied to the frictional engagement elements, the plurality of frictional engagement elements including a release side frictional engagement element and an engagement side frictional element;

generating a slip by reducing a transmission torque of the release side frictional engagement element by reducing the hydraulic pressure applied to the release side frictional engagement element which is under the engagement condition before a shift change and is changed to the disengagement condition after the shift change;

performing the shift change by increasing the transmission torque of the engagement side frictional element by increasing the hydraulic pressure applied to the engagement side frictional element which is under the disengagement condition before the shift change and is changed to the engagement condition after the shift change;

using a reference model having a behavior such that an output is determined to be a predetermined slip amount which smoothly varies over an elapse of time with respect to a target slip amount that varies in a stepped manner; and controlling the hydraulic pressure applied to the release side frictional engagement element using a controller which exhibits a behavior corresponding to the reference model by collaboration of a controlled object and the controller for which a hydraulic pressure applied to the release side frictional engagement element is determined to be an input and a slip amount of the automatic transmission is determined to be an output.

2. The method according to claim 1, wherein the controller used to control the hydraulic pressure applied to the release side frictional engagement element corresponds to a feedback controller for the controlled object.

3. The method according to claim 1, including using a complete model matching method to obtain the controller.

4. The method according to claim 3, comprising controlling the hydraulic pressure applied to the release side frictional engagement element by performing a feedback of an error between an output of the reference model when applying the target slip amount to the reference model and an actual output when applying the target slip amount to a system including the controlled object and the feedback controller.

5. The method according to claim 3, wherein the feedback controller comprises an idling time compensator for compensating an idling time of a hydraulic pressure system.

6. The method according to claim 1, comprising using a binomial model to determine a transfer function of the reference model.

7. The method according to claim 1, comprising determining whether an actual slip amount is greater than zero.

8. The method according to claim 7, wherein the reduction of the hydraulic pressure applied to the release side frictional engagement element involves starting a timer, reducing the hydraulic pressure applied to the release side frictional engagement element by a first predetermined amount when a value of the timer is less a first predetermined value and when it is determined that the actual slip amount is not greater than zero, and reducing the hydraulic pressure applied to the release side frictional engagement element by a second predetermined amount which is less than the first predetermined amount when a value of the timer is greater than the first predetermined value and when it is determined that the actual slip amount is not greater than zero.

9. The method according to claim 1, wherein the increase of the hydraulic pressure applied to the engagement side frictional engagement element involves increasing the hydraulic pressure applied to the engagement side frictional engagement element to a predetermined pre-charge pressure.

10. The method according to claim 9, including, after increasing the hydraulic pressure applied to the engagement side frictional engagement element to the predetermined pre-charge pressure, starting a timer and further increasing the hydraulic pressure applied to the engagement side frictional engagement element if an actual slip amount is greater than zero, the hydraulic pressure applied to the engagement side frictional engagement element being further increased by a first predetermined amount when a value of the timer is less a first predetermined value and being further increased by a second predetermined amount which is greater than the first predetermined amount when the value of the timer is greater than the first predetermined value.

11. A hydraulic pressure control device in an automatic transmission that includes a plurality of frictional engagement elements adapted to be maintained under an engagement condition or a disengagement condition to achieve a predetermined shift by controlling hydraulic pressure applied to the frictional engagement elements, the plurality of frictional engagement elements including a release side frictional engagement element and an engagement side frictional element, with slip being generated by reducing a transmission torque of the release side frictional engagement element through reduction of the hydraulic pressure applied to the release side frictional engagement element which is under the engagement condition before a shift change and is changed to the disengagement condition after the shift change, and with the shift change being performed by increasing the transmission torque of the engagement side frictional element through increase of the hydraulic pressure applied to the engagement side frictional element which is under the disengagement condition before the shift change and is changed to the engagement condition after the shift change, the hydraulic pressure control device comprising:

a reference model exhibiting a behavior such that an output is determined to be a predetermined slip amount which smoothly varies over time relative to a target slip amount that varies in a stepped manner; and a controller which controls the hydraulic pressure applied to the release side frictional engagement element, the controller having a behavior corresponding to the reference model by collaboration of a controlled object and the controller for which a hydraulic pressure applied to the release side frictional engagement element is determined to be an input and a slip amount of the automatic transmission is determined to be an output.

12. The hydraulic pressure control device in an automatic transmission according to claim 11, wherein the controller is a feedback controller for the controlled object.

13. The hydraulic pressure control device in an automatic transmission according to claim 11, wherein the controller is obtained using a complete model matching method.

14. The hydraulic pressure control device in an automatic transmission according to claim 11, wherein the feedback controller comprises an idling time compensator which compensates an idling time of a hydraulic pressure system.

15. The hydraulic pressure control device in an automatic transmission according to claim 11, wherein the reference model possesses a transfer function determined using a binomial model.

* * * * *